US012674667B2

(12) United States Patent　(10) Patent No.: US 12,674,667 B2

Milani et al.　(45) Date of Patent: Jul. 7, 2026

(54) COMPACT DRIVE AND SENSE BALANCED MULTI-AXIS GYROSCOPE

(71) Applicant: InvenSense, Inc., San Jose, CA (US)

(72) Inventors: Damiano Milani, Fontanella (IT);
Lorenzo Bertini, Cascina (IT);
Giacomo Gafforelli, Casatenovo (IT);
Luca Coronato, Corsico (IT)

(73) Assignee: InvenSense, Inc., San Jose, CA (US)

( * ) Notice: Subject to any disclaimer, the term of this patent is extended or adjusted under 35 U.S.C. 154(b) by 237 days.

(21) Appl. No.: 18/602,885

(22) Filed: Mar. 12, 2024

(65) Prior Publication Data

US 2025/0290751 A1　Sep. 18, 2025

(51) Int. Cl.
| *G01C 19/574* | (2012.01) |
| *G01C 19/5712* | (2012.01) |
| *G01C 19/5747* | (2012.01) |
| *G01C 25/00* | (2006.01) |

(52) U.S. Cl.
CPC ..... *G01C 19/5712* (2013.01); *G01C 19/5747* (2013.01); *G01C 25/00* (2013.01)

(58) Field of Classification Search
CPC .............. G01C 19/5712; G01C 19/574; G01C 19/5747
See application file for complete search history.

(56) References Cited

U.S. PATENT DOCUMENTS

| 9,689,677 B2 | 6/2017 | Shao et al. |
| 10,415,968 B2 | 9/2019 | Prikhodko et al. |

| 10,514,259 B2 | 12/2019 | Jia et al. |
| 10,914,584 B2 | 2/2021 | Senkal et al. |
| 11,118,907 B2 | 9/2021 | Senkal et al. |
| 2018/0172447 A1 | 6/2018 | Prikhodko et al. |
| 2018/0283869 A1 | 10/2018 | Kato et al. |
| 2020/0096337 A1* | 3/2020 | Senkal ............... G01C 19/5712 |
| 2021/0381834 A1 | 12/2021 | Gregory et al. |

OTHER PUBLICATIONS

International search report and written opinion of the international searching authority for matter PCT/US2025/016532 dated May 15, 2025 , pp. 09.

* cited by examiner

*Primary Examiner* — John E Breene
*Assistant Examiner* — Alex T Devito
(74) *Attorney, Agent, or Firm* — Van Hoven PC; Joshua Van Hoven

(57) ABSTRACT

A MEMS gyroscope may include a drive system configured to impart a drive motion on a plurality of proof masses within a device plane of the MEMS gyroscope, including first and second in-plane proof masses that are driven in anti-phase and first second out-of-plane proof masses that are driven in anti-phase via the movement of the in-plane proof masses. The out-of-plane proof masses include a separate driven mass and sense mass such that the sense mass does not move in the device plane in response to the drive motion but does move in the device plane in response to an angular velocity about the out-of-plane axis based on a Coriolis force imparted on the drive mass. A coupling link connects the sense masses, thereby synchronizing an anti-phase translation of the sense masses due to the sensed Coriolis force.

20 Claims, 10 Drawing Sheets

602

Apply Drive Motion

604

Couple Drive Motion to
In-Plane Proof Masses

606

Couple Drive Motion to
Out-of-Plane Driven Mass

608

Sense Angular Velocity from
In-Plane Proof Masses

610

Couple Coriolis Motion to
Out-of-Plane Sense Mass

612

Sense Angular Velocity from
Out-of-Plane Sense Mass

COMPACT DRIVE AND SENSE BALANCED MULTI-AXIS GYROSCOPE

BACKGROUND

Numerous items such as smart phones, smart watches, tablets, automobiles, aerial drones, appliances, aircraft, exercise aids, and game controllers may utilize sensors such as microelectromechanical system (MEMS) sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognize skid or roll-over conditions).

A MEMS gyroscope may be implemented as a multi-axis device configured to sense angular velocities about two or three of an x-axis, y-axis, or z-axis. In some implementations, a suspended spring-mass system for the multi-axis MEMS gyroscope may include a shared drive system, such that proof masses associated with each of the axes have a drive motion imparted from the shared drive system via interconnections such as by springs, lever arms, and coupling masses. External forces such as linear accelerations, vibrations, and the like may reduce the accuracy and precision of the measurement of movements in response to Coriolis forces generated on proof masses in response to rotation about one of the sense axes. Further, because the proof masses for different sense axes are coupled within a common structure, drive and sense movements of the components associated with other sense axes may also impact the accuracy and precision of the measurement of the movements due to Coriolis force on another axis, such as by cross coupling of drive and/or sense forces. Attempts to minimize these sources of measurement errors often require duplication of components of sense and drive structures or complex compensation techniques, requiring additional area, materials, and consumption of energy.

SUMMARY

In at least some example illustrations, a MEMS gyroscope includes a drive system configured to impart a drive motion on a plurality of proof masses within a device plane of the MEMS gyroscope. The gyroscope also includes a first in-plane proof mass of the plurality of proof masses, operably coupled to the drive system to oscillate along a first axis in the device plane in response to the drive motion. The first in-plane proof mass moves out of plane in response to an angular velocity about a second axis within the plane and that is perpendicular to the first axis. The gyroscope also includes a second in-plane proof mass of the plurality of proof masses, operably coupled to the drive system to oscillate in anti-phase to the first in-plane proof mass in response to the drive motion. The second in-plane proof mass moves out-of-plane in anti-phase to the first in-plane proof mass in response to the angular velocity about the second axis. The gyroscope further includes a first out-of-plane proof mass. The first out-of-plane proof mass includes a first driven mass operably coupled to the drive system via the first in-plane proof mass to oscillate along an axis parallel to the first axis in the device plane in response to the drive motion. The first driven mass moves in the device plane perpendicular to the first axis in response to an angular velocity about an out-of-plane axis. The first out-of-plane proof mass also includes a first sense mass coupled to the first driven mass such that the first sense mass does not move in the device plane in response to the drive motion. The first sense mass translates perpendicular to the first axis based on the movement of the first driven mass in response to the angular velocity about the out-of-plane axis. The gyroscope further includes a second out-of-plane proof mass comprising a second driven mass and a second sense mass. The second driven mass is operably coupled to the drive system via the second in-plane proof mass to oscillate in anti-phase to the first driven mass in the device plane in response to the drive motion. The second driven mass moves in the device plane perpendicular to the first axis in anti-phase to the first driven mass in response to the angular velocity about the out-of-plane axis. The second sense mass is coupled to the second driven mass such that the second sense mass does not move in the device plane in response to the drive motion. Further, the second sense mass translates perpendicular to the first axis in anti-phase to the first sense mass based on the movement of the first driven mass in response to the angular velocity about the out-of-plane axis. The gyroscope also includes a coupling link connecting the first sense mass to the second sense mass. The coupling link synchronizes the anti-phase translation of the first sense mass and the second sense mass.

In at least some example illustrations, a method of assembling a MEMS gyroscope includes a providing a drive system configured to impart a drive motion on a plurality of proof masses within a device plane of the MEMS gyroscope. The method may also include installing a first in-plane proof mass of the plurality of proof masses, operably coupled to the drive system to oscillate along a first axis in the device plane in response to the drive motion. The first in-plane proof mass moves out of plane in response to an angular velocity about a second axis within the plane and that is perpendicular to the first axis. The method also includes installing a second in-plane proof mass of the plurality of proof masses, operably coupled to the drive system to oscillate in anti-phase to the first in-plane proof mass in response to the drive motion. The second in-plane proof mass moves out-of-plane in anti-phase to the first in-plane proof mass in response to the angular velocity about the second axis. The method also includes installing first and second out-of-plane proof masses. The first out-of-plane proof mass includes a first driven mass operably coupled to the drive system via the first in-plane proof mass to oscillate along an axis parallel to the first axis in the device plane in response to the drive motion. The first driven mass moves in the device plane perpendicular to the first axis in response to an angular velocity about an out-of-plane axis. The first out-of-plane proof mass also includes a first sense mass coupled to the first driven mass such that the first sense mass does not move in the device plane in response to the drive motion. The first sense mass translates perpendicular to the first axis based on the movement of the first driven mass in response to the angular velocity about the out-of-plane axis. The second out-of-plane proof mass comprises a second driven mass and a second sense mass. The second driven mass is operably coupled to the drive system via the second in-plane proof mass to oscillate in anti-phase to the first driven mass in the device plane in response to the drive motion. The second driven mass moves in the device plane perpendicular to the first axis in anti-phase to the first driven mass in response to the angular velocity about the out-of-plane axis. The second sense mass is coupled to the second driven mass such that the second sense mass does not move in the device plane in response to the drive motion. Further, the second sense mass is configured to translates perpendicular to the first axis in anti-phase to the first sense mass based on the movement of the first driven mass in response to the angular velocity about the out-of-plane axis. The method also includes connecting the first sense mass to the second sense mass with a coupling link configured to synchronize the anti-phase translation of the first sense mass and the second sense mass.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

Figure 1:
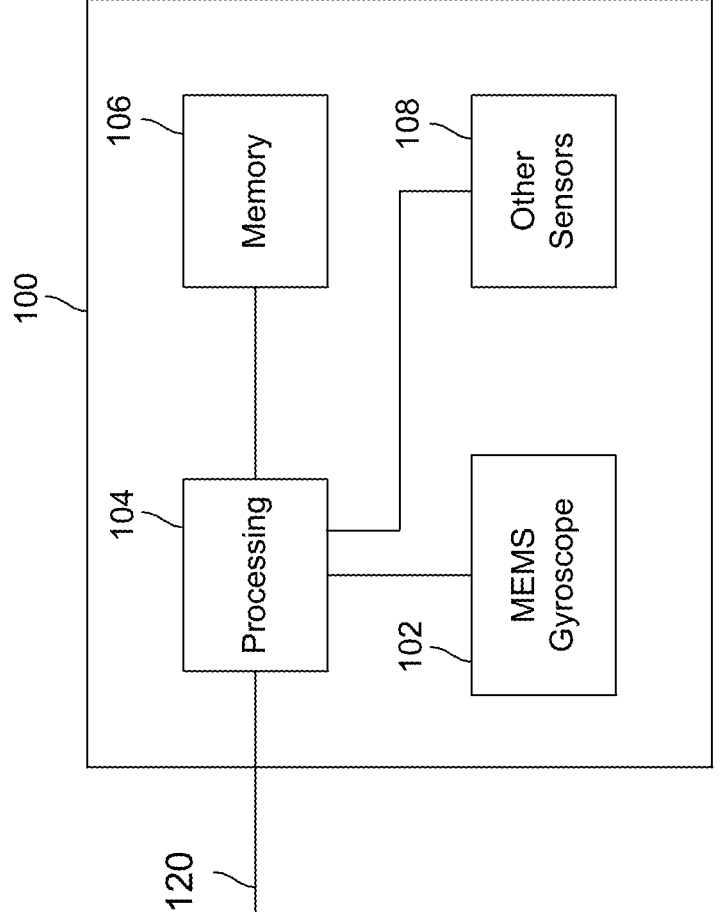
FIG. 1 shows an illustrative MEMS system in accordance with an embodiment of the present disclosure.

Generally, it is desired to reject external vibration and balance drive oscillations in MEMS devices such as gyroscopes. In some previous approaches, movement is balanced or offset by mirroring structures, i.e., with a first structure moving in an opposite direction to a second structure, thereby cancelling effects of external forces and coupled movements within the drive/sense structures. This duplication necessarily increases size and complexity. In contrast, example approaches herein may generally facilitate balancing momentum of a drive system and/or associated masses thereof for a gyroscope in a manner that avoids such duplication. In some example approaches, separate coupling and sense masses may be provided to facilitate balancing of reaction forces that may occur during angular rotation of the gyroscope.

In embodiments of the present disclosure, a multi-axis MEMS gyroscope is capable of having a single drive motion move multiple interconnected proof masses to simultaneously sense angular velocity about multiple axes. The interconnections of the proof masses and configurations thereof provide for robustness to undesirable external forces and also result in a system that is balanced with respect to rotational momentum and to linear drive and sense movements. An out-of-plane (e.g., z-axis) proof mass may include multiple components including a driven mass and a sense mass, with the driven mass experiencing the Coriolis force during a drive motion while being coupled to the sense mass in a manner that the sense mass does not experience the drive motion, avoiding coupling of the drive motion to the in-plane sensing of the out-of-plane angular velocity. Further, a sense mass of an anti-phase second out-of-plane proof mass may be coupled to the other sense mass such that the anti-phase sense motion is robustly coupled, further enhancing sensitivity and rejection of spurious motions.

In-plane (e.g., sensing angular velocity about an x-axis or y-axis) proof masses may move in-plane due to the drive motion and deflect out-of-plane in response to the angular velocity about an axis perpendicular to the drive motion. For each in-plane sense axis, two proof masses may be driven in anti-phase in-plane and may therefore deflect in anti-phase out of plane in response to the angular velocity being sensed. For each in-plane sense axis, the linear drive motions of the respective proof masses are mechanically coupled such as by a lever arm or drive system that rotates about a hinging point to synchronize the anti-phase drive motions. The direct (e.g., via a drive linkage) or indirect (e.g., via an interposed drive system) connections between the proof masses may be such that one of the in-plane sense axes results in an angular momentum in a first rotation direction (e.g., clockwise) while the other of the in-plane sense axes results in an angular momentum in a second opposite rotation direction (e.g., counterclockwise), with the respective rotational directions changing as the proof masses are driven linearly in the opposite anti-phase direction. Accordingly, the angular momentums that are generated during drive oscillations of the in-plane systems counteract each other and can be tuned (e.g., by selecting component sizes and coupling configurations) such that the net angular momentum is zero. Balancing or nulling reaction forces and momentum in this manner decreases energy dissipation to the substrate, vibration propagation, mechanical disturbance to external devices (e.g. other sensors on a printed circuit board, such as another gyroscope or an accelerometer, may sense these forces), or disturbances to other oscillators (e.g., quartz) that can interact with these vibrations.

FIG. 1 shows an illustrative MEMS system 100 in accordance with an embodiment of the present disclosure. Although particular components are depicted in FIG. 1, it will be understood that other suitable combinations of the MEMS, processing components, memory, and other circuitry may be utilized as necessary for different applications and systems. In accordance with the present disclosure, the MEMS system may include a MEMS gyroscope 102 as well as additional sensors 108. Although the present disclosure will be described in the context of particular MEMS gyroscope configurations (e.g., electrostatic drive and capacitive sensing of multiple axes, based on a shared drive system), it will be understood that of the present disclosure may be utilized with a variety of MEMS sensor types with mechanical coupling between axes.

Processing circuitry 104 may include one or more components providing processing based on the requirements of the MEMS system 100. In some embodiments, processing circuitry 104 may include hardware control logic that may be integrated within a chip of a sensor (e.g., on a base substrate of a MEMS gyroscope 102 or other sensors 108, or on an adjacent portion of a chip to the MEMS gyroscope 102 or other sensors 108) to control the operation of the MEMS gyroscope 102 or other sensors 108 and perform aspects of processing for the MEMS gyroscope 102 or the other sensors 108. In some embodiments, the MEMS gyroscope 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS gyroscope 102 by interacting with the hardware control logic and processing signals received from MEMS gyroscope 102. The microprocessor may interact with other sensors 108 in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS gyroscope 102 or other sensors 108 may communicate directly with external circuitry (e.g., via a serial bus or direct connection to sensor outputs and control inputs), in an embodiment the processing circuitry 104 may process data received from the MEMS gyroscope 102 and other sensors 108 and communicate with external components via a communication interface 120 (e.g., a serial peripheral interface (SPI) or I2C bus, in automotive applications a controller area network (CAN) or Local Interconnect Network (LIN) bus, or in other applications a suitably wired or wireless communications interface as is known in the art). The processing circuitry 104 may convert signals received from the MEMS gyroscope 102 and other sensors 108 into appropriate measurement units (e.g., based on settings provided by other computing units communicating over the communication interface 120) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS gyroscope 102 or other sensors 108.

In some embodiments, certain types of information may be determined based on data from multiple MEMS gyroscopes 102 and other sensors 108 in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

Figure 2A:
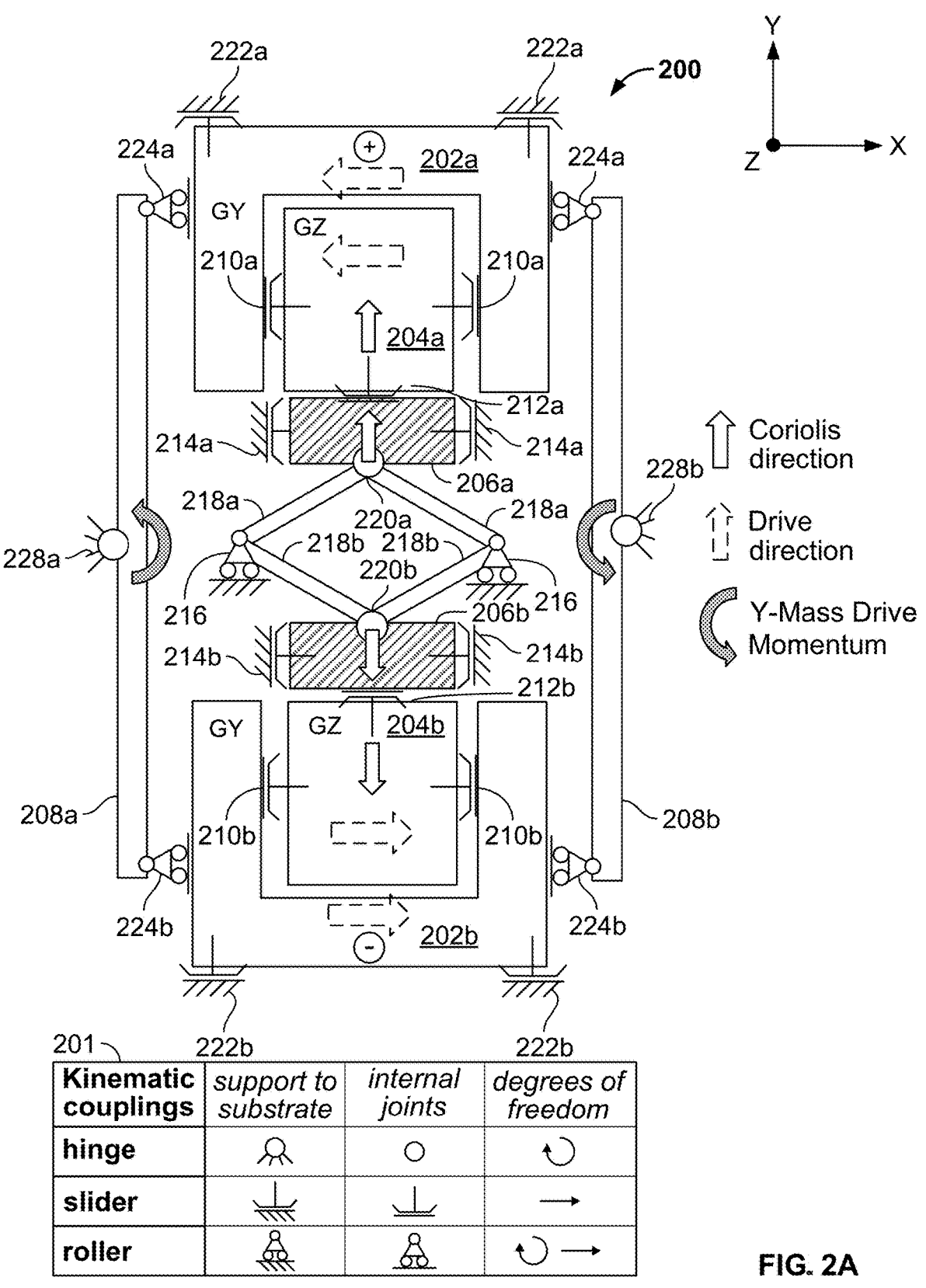
FIG. 2A depicts an exemplary drive balanced two-axis MEMS gyroscope in accordance with an embodiment of the present disclosure.
Figure 2B:
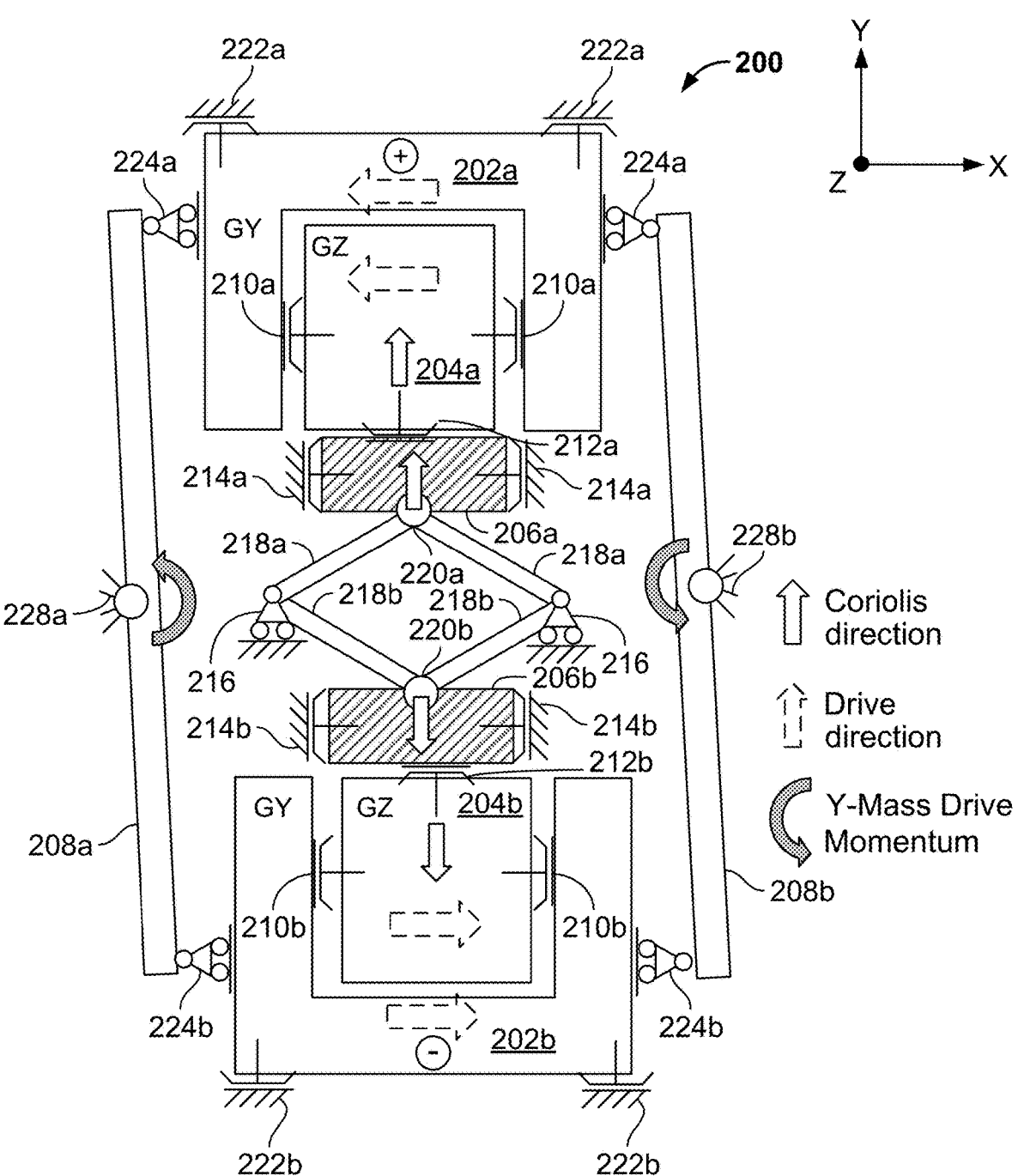
FIG. 2B depicts an exemplary drive motion of the drive balanced two-axis MEMS gyroscope of FIG. 2A in accordance with an embodiment of the present disclosure.

Turning now to FIG. 2A, an exemplary drive balanced two-axis MEMS gyroscope 200 is illustrated and described in further detail, in accordance with an embodiment of the present disclosure. FIG. 2B illustrates the gyroscope 200 of FIG. 2A while a drive motion is imparted to components of the gyroscope 200, with the drive and other components of the gyroscope being moved as discussed further below. Although FIGS. 2A and 2B will be described in the context of a particular application and system components, it will be understood that the present disclosure may be utilized with a variety of multi-axis gyroscope configurations. Although particular components are depicted and described in FIGS. 2A and 2B, it will be understood that components may be added, removed, substituted, or modified in accordance with the present disclosure.

The depiction of the MEMS gyroscopes of FIG. 2A and FIGS. 2B, 3A, 3B, 4A, 4B, and 5 herein are depicted in simplified form, in a manner that will be understood to person having ordinary skill in the art. Although particular shapes, sizes, and interconnections are depicted for components of masses, couplings, springs, and the like, it will be understood that a variety of configurations can be implemented in accordance with the present disclosure while maintaining respective relative linear and rotational movements in a manner that minimizes or eliminates internal coupling of undesired forces to the resulting sense motions. Certain components such as drive and sense electrodes are not depicted, but may be implemented in a variety of configurations as is known in the art.

In the figures depicted herein, the connections between gyroscope components and to anchoring points (e.g., on a fixed component within the MEMS device layer or via an anchor to a substrate and/or cap of the MEMS gyroscope) is depicted via kinematic couplings 201. It will be understood that each of the kinematic couplings 201 may be implemented with a variety of springs, couplings, coupling masses, lever arms, and other similar components that may be fabricated within a MEMS layer, for example, by selecting a size and shape of a spring to facilitate particular linear, rotational, or torsional coupling movements along or about particular axes while rejecting other movements. Accordingly, interconnections herein will be described based on the kinematic couplings of a "hinge" (e.g., facilitating rotational movement about an axis), a "slider" (e.g., facilitating linear movement along an axis), and a "roller" (e.g., facilitating both linear and rotational movement), and will be understood to include all suitable implementations thereof.

The MEMS gyroscope 200 may include a drive system (not depicted in FIG. 2A) configured to impart a drive motion on a plurality of proof masses, e.g., within a device plane of the MEMS gyroscope 200. For example, a drive system may include one or more fixed drive electrodes (e.g., comb electrodes) located in the device plane adjacent to one or more driven masses (e.g., including interfacing comb electrodes) such as one of the proof masses or a separate drive mass. The drive motion is then imparted on other components of the system via interconnected springs, masses, couplings, lever arms, and the like to facilitate desired drive motions (e.g., linear translations and/or rotations along or about particular axes, perpendicular to an axis about which an angular velocity is to be sensed and also perpendicular to a direction of a Coriolis force generated by the coupling of the angular velocity to the drive motion) on one or more masses (e.g., directly on a proof mass or on an adjacent mass that couples the movement due to Coriolis to a proof mass).

In the example illustrated in FIG. 2A, a drive motion is imparted to a first in-plane proof mass 202a (e.g., directly or via one or more drive masses (not depicted)) along the x-axis, which is configured to be driven in anti-phase along the x-axis (dashed arrows, only one drive direction) establishing a first axis in the device plane. In the context of the present disclosure, an "in-plane proof mass" refers to a proof mass that experiences a Coriolis force in response to an angular velocity about an in-plane axis (e.g., the x-axis or the y-axis) while an "out-of-plane proof mass" refers to a proof mass that experiences a Coriolis force in response to an angular velocity about an out-of-plane axis (e.g., the z-axis). In some examples, the sense motion of an in-plane proof mass may be out-of-plane in response to the in-plane angular velocity, while the sense motion of an out-of-plane proof mass may be in-plane in response to the out-of-plane angular velocity.

The drive motion causes the first in-plane proof mass 202a to oscillate such that the proof mass 202a moves in the direction indicated by the dashed arrow and subsequently in the opposite direction. An angular velocity applied to the gyroscope 200 about a second axis oriented within the device plane and perpendicular to the first axis (e.g., in the y-axis direction in FIG. 2A) will cause the first in-plane proof mass 202a to move out of the device plane, resulting in a sense oscillation along the x-axis. The drive movement of the first in-plane proof mass 202a and the second in-plane proof mass 202b away from each other is facilitated by sliders 222a and 222b, while the respective sense movements of the first proof mass 202a and the second proof mass 202b out-of-plane are depicted by the "+" and "−" symbols on the proof masses.

The gyroscope 200 includes a second in-plane proof mass 202b which is operably coupled to the drive system to oscillate in anti-phase to the first in-plane proof mass 202a in response to the drive motion. Additionally, the second in-plane proof mass 202b moves out-of-plane (e.g., in the vertical direction) in anti-phase to the first in-plane proof mass 202a in response to the angular velocity about the second axis. The oscillation of the first in-plane proof mass 202a and second in-plane proof mass 202b in opposite directions may balance out reaction forces associated with the movement of the first and second in-plane proof masses 202a and 202b. In the examples herein, one or more coupling links, lever arms, or other rigid bodies may be configured to link movement of the first in-plane proof mass 202a to that of the second in-plane proof mass 202b, as will be discussed further below.

The gyroscope 200 also includes one or more out-of-plane proof masses. The out-of-plane proof masses may be configured to move in response to an angular velocity applied to the gyroscope about an axis that perpendicular the device plane (e.g., about the x-axis). In the illustrated example of FIG. 2A, the gyroscope 200 includes two out-of-plane proof masses, each including a respective driven mass and sense. A first out-of-plane proof mass includes a first driven mass 204a and first sense mass 206a, while a second out-of-plane proof mass is provided by a second driven mass 204b and a second sense mass 206b. The sense masses 206a and 206b are each constrained to movement along the Coriolis direction, e.g., by respective sliders 214a and 214b. For example, first sense mass 206a is slidably retained between a pair of first slide sliders 214a, and the second sense mass 206b is slidably retained between a pair of second slide sliders 214b.

The first driven mass 204a is operably coupled to the drive system via the first in-plane proof mass 202a. More specifically, the first driven mass 204a is connected by sliders 210a to the in-plane proof mass 202a, which directly transmit the drive motion of the in-plane proof mass 202a such that the first driven mass 204a oscillates with the oscillation of the in-plane proof mass 202a. Accordingly, the first driven mass 204a oscillates in the device plane, e.g., along an x-axis parallel to the first x-axis (i.e., the axis of movement of the in-plane proof mass 202a) in response to the drive motion of the in-plane proof mass 202a. Further, the first driven mass 204a moves in the device plane along the y-axis perpendicular to the first (drive or x-) axis in response to a Coriolis force caused by an angular velocity about an out-of-plane axis (z-axis). For example, as illustrated in FIGS. 2A-B, a Coriolis force will cause the driven mass 204a to move upwardly in response to an angular velocity about the out-of-plane axis, e.g., an axis perpendicular to the device plane.

The first sense mass 206a is coupled to the first driven mass 204a by slider 212a such that the first sense mass 206a does not move along the x-axis in the device plane in response to the drive motion and to translate perpendicular to the first axis (e.g., upward along the y-axis as illustrated in FIG. 2B) based on the movement of the first driven mass 204a due to a Coriolis force in response to the angular velocity about the out-of-plane axis. In this manner, slider 212a functions as a Coriolis coupling that does not transmit a drive force between the drive and sense mass but does transmit the Coriolis force. The slider 212a is compliant in response to the drive motion in the x-direction (e.g., drive movement of the driven mass 204a is not translated to the first sense mass 206a) and is rigid in response to a Coriolis force in the y-direction caused by the angular velocity about the out-of-plane axis (e.g., the first sense mass 206a moves in the Coriolis (y-axis) direction in conformance with the first driven mass 204a in response to an angular velocity about the out-of-plane z-axis). Similarly, a slider 212b is provided between the second driven mass 204b and the second sense mass 206b. The slider 212b is compliant in response to the drive motion in the x-direction and is rigid in response to the Coriolis force caused by the angular velocity about the out-of-plane z-axis. Accordingly, in examples herein the first and the second sense masses 206a and 206b may achieve differential coupling of the Coriolis response, e.g., as a result of the Coriolis couplings 212a and 212b.

Generally, the second out-of-plane proof mass (i.e., second driven mass 204b and second sense mass 206b) is configured similarly to the first out-of-plane proof mass (i.e., first driven mass 204a and first sense mass 206a) described above. That is, the second drive mass 204b is operably coupled to the drive system via the sliders 210b and the second in-plane proof mass 202b. Accordingly, the second driven mass 204b will oscillate in response to drive motion of second in-plane proof mass 202b. Moreover, the oscillatory motion of the second driven mass 204b will be opposite that of the first driven mass 204a within the device plane. In this manner, the second driven mass 204b will be in anti-phase to the first driven mass 204a in the device plane in response to the drive motion. Furthermore, the second driven mass 204b will also move in the device plane perpendicular to the first axis in anti-phase to the first driven mass 204a in response to the above-described angular velocity about the out-of-plane axis. As illustrated in FIG. 2B, Coriolis forces imparted to the driven masses 204a and 204b as a result of the angular velocity will tend to drive the driven masses 204a and 204b apart from each other and towards each other, depending on the drive direction and whether the angular velocity is imparted clockwise or counter-clockwise about the out-of-plane z-axis.

The second proof mass also includes the second sense mass 206b which is coupled to the second driven mass 204b by slider 212b. The second sense mass 206b does not move in the device plane in response to the drive motion as a result of slider 212b allowing relative translation in the device plane (e.g., along the x-direction as illustrated in FIGS. 2A and 2B). The second sense mass 206b does, however, translate perpendicular to the first axis along the y-axis in anti-phase to the first sense mass 206a based on the movement of the first driven mass 204*a* and in response to the angular velocity about the out-of-plane z-axis. Accordingly, the first and second sense masses 206*a*, 206*b* may sense angular velocity (e.g., by moving relative to fixed sense electrodes within the device plane, not depicted) while being decoupled from drive movement of the driven masses 204*a*, 204*b*, respectively. Further, the separation of the out-of-plane proof mass into distinct driven mass 204 and sense mass 206 improves the effective area of the sensing electrodes located adjacent to the sense mass, which only moves in response to the Coriolis force.

The second out-of-plane proof mass (i.e., including the second driven mass 204*b* and second sense mass 206*b*) is linked to the first out-of-plane proof mass (i.e., first driven mass 204*a* and first sense mass 206*a*) via a coupling link 218. In the example illustrated in FIGS. 2A and 2B, multiple coupling links 218 are provided as rigid bodies or arms that are connected via one or more rollers 216 and hinges 220*a* and 220*b*. More specifically, in the example illustrated each of two upper coupling links 218*a* is connected to a respective one of two lower coupling links 218*b* via one of the rollers 216*a* and 216*b*. The first sense mass 206*a* is connected to the upper coupling links 218*a* via hinge 220*a*, and the second sense mass 206*b* is connected to the lower coupling links 218*b* via hinge 220*b*. The coupling link 218 synchronizes the anti-phase translation of the first sense mass 206*a* and the second sense mass 206*b*. More specifically, when the anti-phase translation of the out-of-plane sense masses 206*a* and 206*b* is towards each other, hinges 220*a* and 220*b*, and roller 216, allow the coupling links 218*a* and 218*b* to move towards each other along the y-direction and outward along the x-direction based on the x-axis linear degree of freedom of sliders 216. When the anti-phase translation of the out-of-plane sense masses 206*a* and 206*b* is away each other, hinges 220*a* and 220*b*, and roller 216, allow the coupling links 218*a* and 218*b* to move away from each other in the y-direction and inward along the x-direction based on the x-axis linear degree of freedom of sliders 216.

As noted above, movement of the first in-plane proof mass 202*a* may be linked to that of the second in-plane proof mass 202*b*, e.g., to link drive movement in the device plane of the first in-plane proof mass 202*a* to that of the second in-plane proof mass 202*b* (and vice versa). For example, one or more coupling links, lever arms, or other rigid bodies may be configured to link movement of the first in-plane proof mass 202*a* to that of the second in-plane proof mass 202*b*, as will be discussed further below. As shown in FIGS. 2A and 2B, a first lever arm 208*a* is connected to a first (e.g., x-axis left) side of the first in-plane proof mass 202*a* via roller a first roller 224*a* and a first (e.g., x-axis left) side of the second in-plane proof mass 202*b* via a first roller 224*b*. A second lever arm 208*b* is connected to a second side (e.g., x-axis right) of the first in-plane proof mass 202*a* opposite the first (e.g., x-axis left) side of the first in-plane proof mass 202*a* via a second roller 224*a*, as well as to a second (e.g., x-axis right) side of the second in-plane proof mass 202*b* opposite the first (e.g., x-axis left) side of the second in-plane proof mass 202*b* via a second roller 224*b*. The lever arm 208*a* is pivotally coupled to the substrate via a hinge 228*a*, while the lever arm 208*b* is pivotally coupled to the substrate via a hinge 228*b*. The lever arms 208 may be provided by any link, rigid body, or the like. Further, other linkage system producing similar behavior, i.e., differentially coupling both the drive movements and Coriolis movements of the proof masses 202*a* and 202*b*, may be employed.

The arrows depicted in FIG. 2A depict drive directions (dashed arrows), Coriolis sense direction (solid arrows and circles with "+" and "−" symbols), and y-mass drive momentum about the hinges 228*a* and 228*b* (gray shaded semicircular arrows). Although not depicted in FIGS. 2A and 2B, the driven masses 204*a* and 204*b* of the out-of-plane proof masses may also be used to sense rotation about the in-plane axis (e.g., based on sense electrodes parallel to the device plane such as on a substrate below the driven masses 204*a* and 204*b*), for example, by moving out of plane similar to the in-plane proof masses 202*a* and 202*b*.

FIG. 2A shows these components prior to any drive motion being imparted (e.g., at a center point of the x-axis drive oscillation), while the movement of the gyroscope components in response to this drive motion is depicted in FIG. 2B. It will be understood that during the anti-phase portion of the drive oscillation each of the arrows will point in an opposite direction, e.g., with the x-axis drive motion of in-plane proof mass 202*a* and driven mass 204*a* of the upper out-of-plane proof mass in the positive x-direction, the x-axis drive motion of in-plane proof mass 202*b* and driven mass 204*b* of the lower out-of-plane proof mass in the negative x-direction, the Coriolis motion of the driven mass 204*a* and sense mass 206*a* of the upper out-of-plane proof mass in the negative y-direction, the Coriolis motion of the driven mass 204*b* and sense mass 206*b* of the lower out-of-plane proof mass in the positive y-direction, the rotation of lever arm 208*a* about hinge 228*a* being clockwise, and the rotation of lever arm 208*b* about hinge 228*b* being clockwise. Within the structure of FIGS. 2A and 2B, the sense masses 206*a* and 206*b* are thus connected within a sense architecture which not only doesn't include a drive motion but is also coupled to restrict and allow movement only in the anti-phase (e.g., along a y-axis) sense direction. The mechanism also rejects rotational vibrations, because the centers of the out-of-plane sense masses are aligned along the sense direction.

Figure 3A:
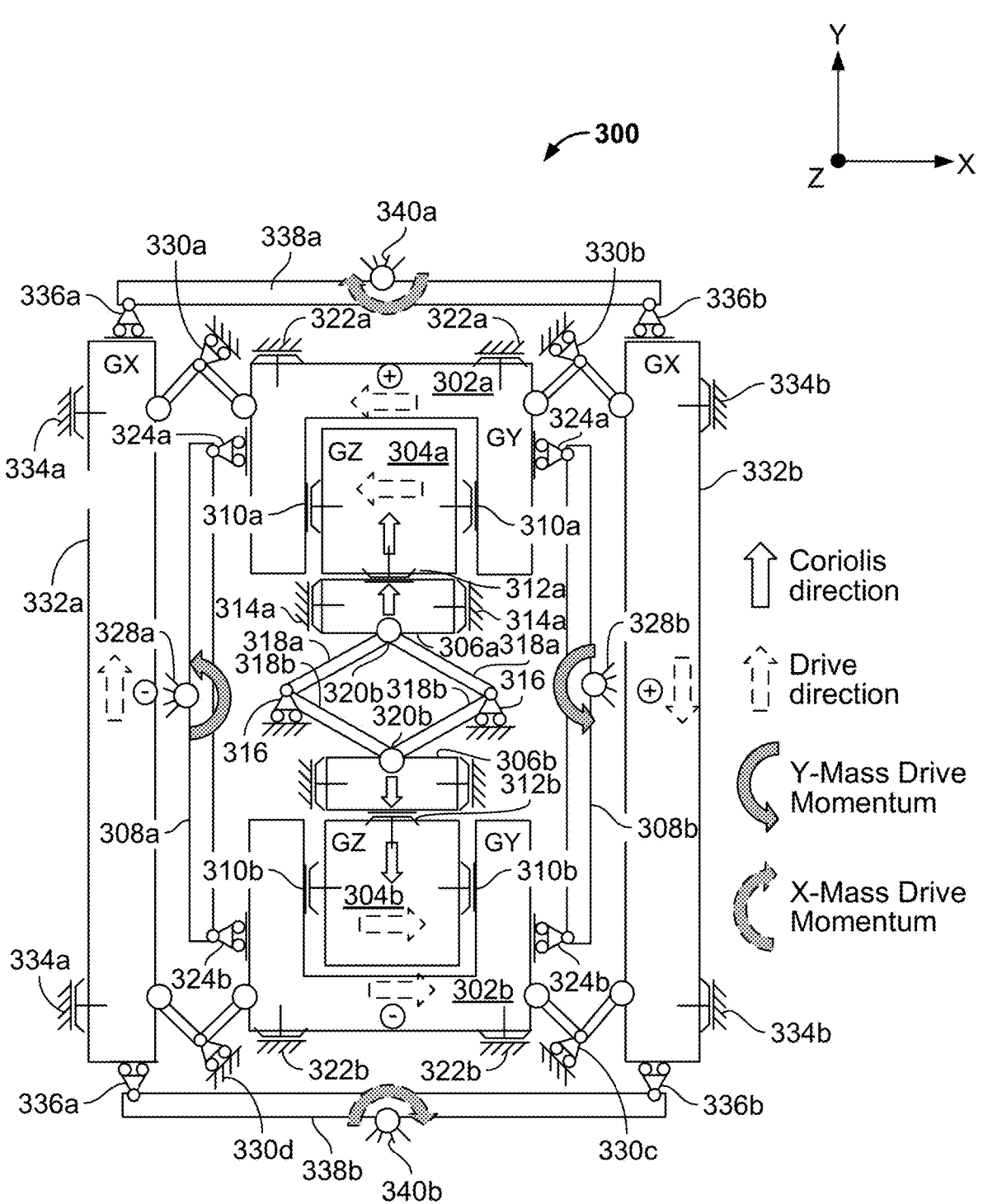
FIG. 3A depicts an exemplary balanced three-axis MEMS gyroscope in accordance with an embodiment of the present disclosure.
Figure 3B:
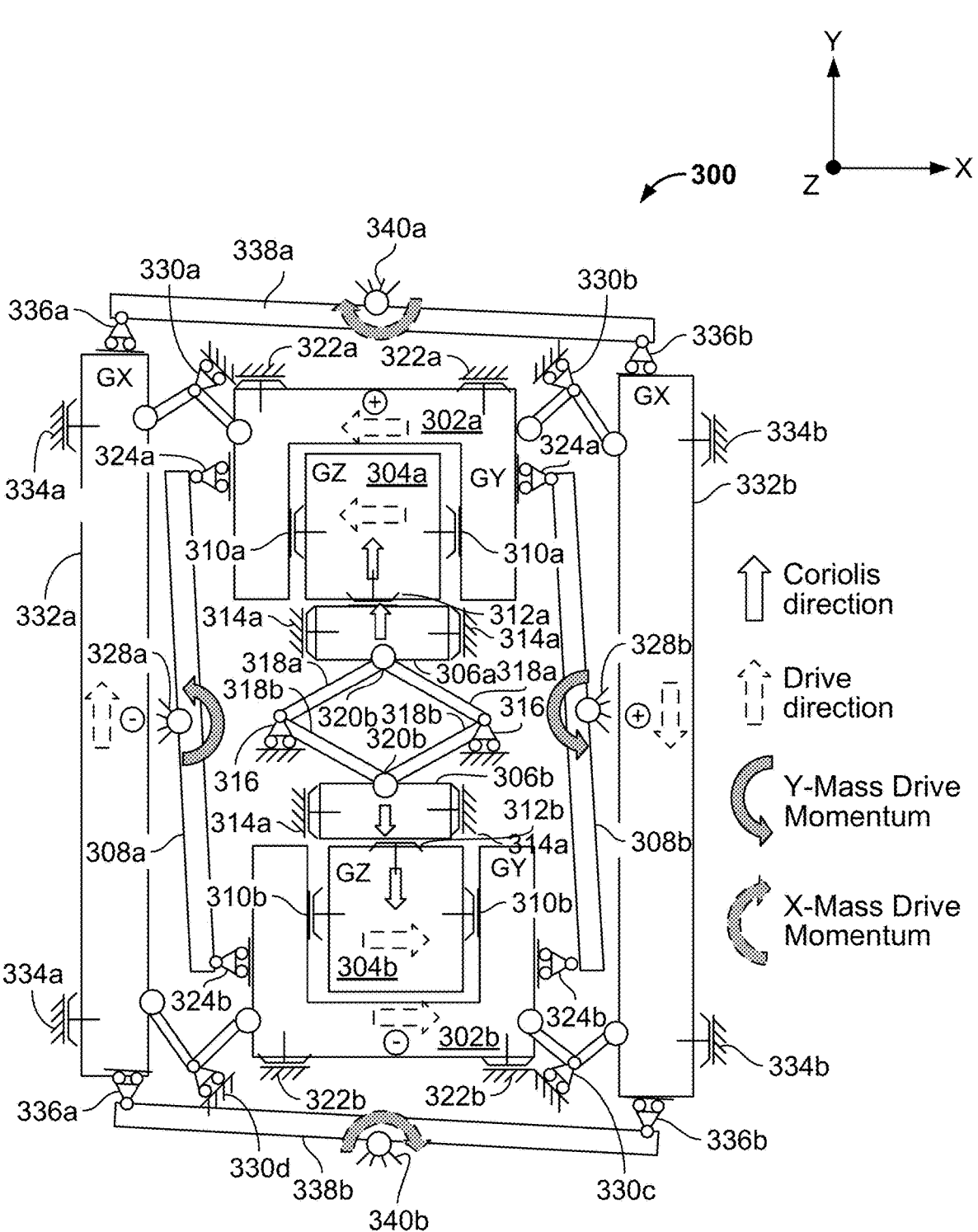
FIG. 3B depicts an exemplary drive motion of the balanced three-axis MEMS gyroscope of FIG. 3A in accordance with an embodiment of the present disclosure.

Referring now to FIGS. 3A and 3B, an exemplary balanced three-axis MEMS gyroscope 300 is illustrated and described in further detail, in accordance with an embodiment of the present disclosure. More specifically, FIG. 3A illustrates the gyroscope 300 in an initial or nominal position of an anti-phase movement, with FIG. 3B illustrating the gyroscope 300 with drive and other components of the gyroscope 300 during a first portion of the anti-phase drive motion. Although FIGS. 3A and 3B will be described in the context of a particular application and system components, it will be understood that the present disclosure may be utilized with a variety of multi-axis gyroscope configurations. Although particular components are depicted and described in FIGS. 3A and 3B, it will be understood that components may be added, removed, substituted, or modified in accordance with the present disclosure.

The components of gyroscope 300 for the first in-plane axis (e.g., for sensing angular velocity about the y-axis) and the out-of-plane axis (e.g., for sensing angular velocity about the z-axis) are identical to those of gyroscope 200 of FIGS. 2A and 2B and operate in the same manner. Thus, for example, in-plane proof mass 302*a* corresponds to in-plane proof mass 202*a*, sliders 310*a* correspond to sliders 210*a*, and like throughout the gyroscopes 300 and 200.

The gyroscope 300 also includes additional in-plane proof masses 332 that are driven by a common drive system via proof masses 302 and that move out-of-plane in response to an angular velocity about an in-plane axis (e.g., the x-axis). More specifically, a third in-plane proof mass 332*a* is operably coupled to the first in-plane proof mass 302*a* via drive linkage 330*a* and to the second in-plane proof mass 302*b* via drive linkage 330*d*, while a fourth in-plane proof mass 332*b* is operably coupled to the first in-plane proof mass 302*a* via drive linkage 330*b* and to the second in-plane proof mass 302*b* via drive linkage 330*c*.

The drive linkage system transfers the anti-phase x-axis drive motion imparted on the first in-plane proof mass 302*a* and the second in-plane proof mass 302*b* to the third in-plane proof mass 332*a* and fourth in-plane proof mass 332*b* in a manner such that, with other supporting and coupling connections, the third in-plane proof mass 332*a* and fourth in-plane proof mass 332*b* move in anti-phase in the x-direction. Each of the drive linkages 330*a*-330*d*, includes a first hinge connection to one of the in-plane proof masses 302*a*/302*b* and a second hinge connection to one of the in-plane proof masses 332*a*/332*b*. A rigid member connects each of these respective hinges to a roller which translates between x-axis drive motion (e.g., for in-plane proof masses 302*a* and 302*b*) and y-axis drive motion (e.g., for in-plane proof masses 332*a* and 332*b*). Accordingly, each drive linkage 330*a*-330*d* may extend/contract and the central roller may translate in a single direction/axis. In this manner, each of the drive linkages thus modifies the x-axis drive motion imparted on the in-plane proof masses 302*a* and 302*b* into a y-axis drive motion imparted on the in-plane proof masses 332*a* and 332*b*. The y-axis anti-phase movement of third and fourth proof mass 332*a* and 332*b* is further restricted by the sliders 334*a* and 334*b*, with sliders 334*a* restricting the third in-plane proof mass 332*a* to y-axis movement within the device plane and sliders 334*b* restricting the fourth in-plane proof mass 332*b* to y-axis movement within the device plane. Further, the third in-plane proof mass 332*a* moves out of plane in response to an angular velocity about the x-axis (i.e., oriented in the drive direction of the in-plane proof masses 302*a* and 302*b*). Further, the fourth in-plane proof mass 332*b* moves out-of-plane in anti-phase to the third in-plane proof mass 332*a* in response to the angular velocity about the x-axis.

The third and fourth in-plane proof masses 332*a* and 332*b* are also mechanically coupled to synchronize the anti-phase drive oscillation in the y-direction. Although such coupling may be performed in a variety of manners and coupling configuration (e.g., combinations of masses, lever arms, rollers, sliders, hinges, etc.), in the embodiment of FIGS. 3A and 3B a third lever arm 338*a* is connected to a first side of the third in-plane proof mass 332*a*, e.g., with a roller 336*a*. The roller 336*a* may allow x-axis linear movement along the first side of the third in-plane proof mass 332*a*, and may pivot with respect to the lever arm 338*a* at a connection point thereto. Additionally, the third lever arm 338*a* is connected to a first side of the fourth in-plane proof mass 332*b*, e.g., with a further roller 336*b*. The roller 336*b* may allow x-axis linear movement along the first side of the fourth in-plane proof mass 332*b*, and may pivot with respect to the lever arm 338*a* at a connection point thereto. The fourth lever arm 338*b* is connected to the second side of the third in-plane proof mass 332*a* with another roller 336*a*, and to the second side of the fourth in-plane proof mass 332*b* with a further roller 336*b*, which operate similarly to the rollers 336 attached at the opposite sides of the in-plane proof masses 332. At the center of each of the lever arms 338*a* and 338*b* is a respective hinge 340*a* or 340*b*.

Accordingly, as depicted in FIGS. 3A (stationary) and 3B (in motion), when third in-plane proof mass 332*a* is driven along the positive y-axis direction due to the negative x-direction movement of first in-plane proof mass 302*a* (e.g., towards third in-plane proof mass 332*a* causing positive y-direction displacement due to the angled translation of the roller of drive linkage 330*a*) and the positive x-direction movement of second in-plane proof mass 302*b* (e.g., away from third in-plane proof mass 332*a* causing positive y-direction displacement due to the angled translation of the roller of drive linkage 330*d*), the left side of lever arm 338*a* is pushed in the positive y-direction via roller 336*a* and the left side of lever arm 338*b* is pulled in the positive y-direction via the other roller 336*a*, causing a clockwise rotation of lever arm 338*a* about hinge 340*a*. When fourth in-plane proof mass 332*b* is driven along the negative y-axis direction due to the negative x-direction movement of first in-plane proof mass 302*a* (e.g., away from fourth in-plane proof mass 332*b* causing negative y-direction displacement due to the angled translation of the roller of drive linkage 330*b*) and the positive x-direction movement of second in-plane proof mass 302*b* (e.g., towards fourth in-plane proof mass 332*b* causing negative y-direction displacement due to the angled translation of the roller of drive linkage 330*d*), the right side of lever arm 338*a* is pulled in the negative y-direction via roller 336*b* and the right side of lever arm 338*b* is pushed in the negative y-direction via the other roller 336*b*, causing a clockwise rotation of lever arm 338*b* about hinge 340*b*.

The lever arms 308 and 338 may each pivot about respective pivot points disposed generally centrally with respect to the lever arms. For example, the first lever arm 308*a* may be pivotally supported by a first pivot point 328*a* such that the first lever arm 308*a* rotates about the first pivot point 328*a* in a first rotational direction in response to the drive motion. Similarly, the second lever arm 308*b* may rotate about a second pivot point 328*b* in the first rotational direction in response to the drive motion. Further, third lever arm 338*a* may be pivotally supported at a third pivot point 340*a* such that the third lever arm 338*a* rotates about the third pivot point 340*a* in a second rotational direction that is opposite the first rotational direction in response to the drive motion. Similarly, the fourth lever arm 338*b* rotates about a fourth pivot point 340*b* in the second rotational direction in response to the drive motion. As illustrated in FIG. 3B, the rotational directions of the first lever arm 308*a* and second lever arm 308*b* are in a same direction which is opposite that of the third lever arm 338*a* and the fourth lever arm 338*b*. As a result, counter-clockwise pivoting of the first lever arm 308*a* and second lever arm 308*b* occurs while the third lever arm 338*a* and the fourth lever arm 338*b* are pivoting clockwise, and vice versa. During the other portion of the anti-phase drive motion, these rotational directions will be reversed. But in each instance the rotational movements of the inner in-plane system are in an opposite rotational direction from the outer in-plane system. Accordingly, not only are all of the linear motions within the gyroscope balanced, but the rotational motions may also be balanced.

The first in-plane proof mass 302*a*, the second in-plane proof mass 302*b*, the first lever arm 308*a*, and the second lever arm 308*b* may collectively comprise a first in-plane driven system. The third in-plane proof mass 332*a*, the fourth in-plane proof mass 332*b*, the third lever arm 338*a*, and the fourth lever arm 338*b* may collectively comprise a second in-plane driven system. As illustrated in FIGS. 3A and 3B, the second in-plane driven system surrounds the first in-plane driven system within the device plane. Additionally, the first lever arm 308*a* is located adjacent to the third in-plane proof mass 332*a*, the second lever arm 308*b* is located adjacent to the fourth in-plane proof mass 332*b*, the third lever arm 338*a* is located adjacent to the first in-plane proof mass 302*a*, and the fourth lever arm 338*b* is located adjacent to the second in-plane proof mass 302*b*. Furthermore, the third in-plane proof mass 332*a* is located outside of the first lever arm 308*a* with respect to a center point of the MEMS gyroscope 300, e.g., near the coupling link 318. Additionally, the fourth in-plane proof mass 332*b* is located outside of the second lever arm 308*b* with respect to the center point, the third lever arm 338*a* is located outside of the first in-plane proof mass 302*a* with respect to the center point, and the fourth lever arm 338*b* is located outside of the second in-plane proof mass 302*b* with respect to the center point.

The first and second drive systems described above may advantageously have distinct drive momentums, e.g., while oscillating from the drive motion. Further, a first drive momentum associated with the rotations of the first lever arm 308*a* and the second lever arm 308*b* may be balanced with a second drive momentum associated with the rotations of the third lever arm 338*a* and the fourth lever arm 338*b*. The rotational and oscillatory motion of components in the first drive system may, accordingly, cancel out the rotational and oscillatory motion of components in the second drive system. In this manner, the angular moment can be nulled by tuning inertias, i.e., properly designing the proof masses and their position with respect to pivot points and balancing the mass inertial accelerations by means of proper kinematic coupling.

Figure 4A:
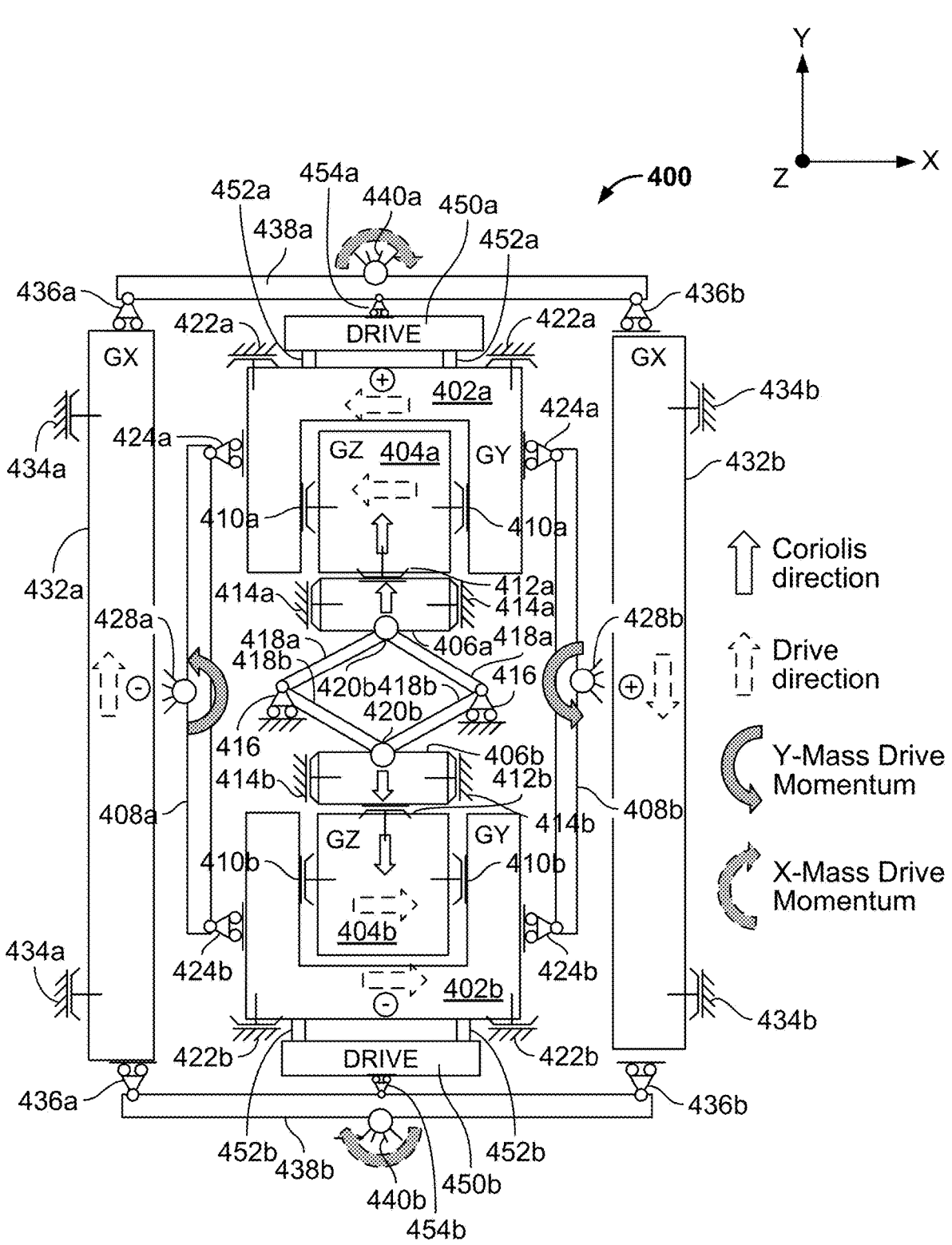
FIG. 4A depicts an exemplary balanced three-axis MEMS gyroscope including coupling through a drive system in accordance with an embodiment of the present disclosure.
Figure 4B:
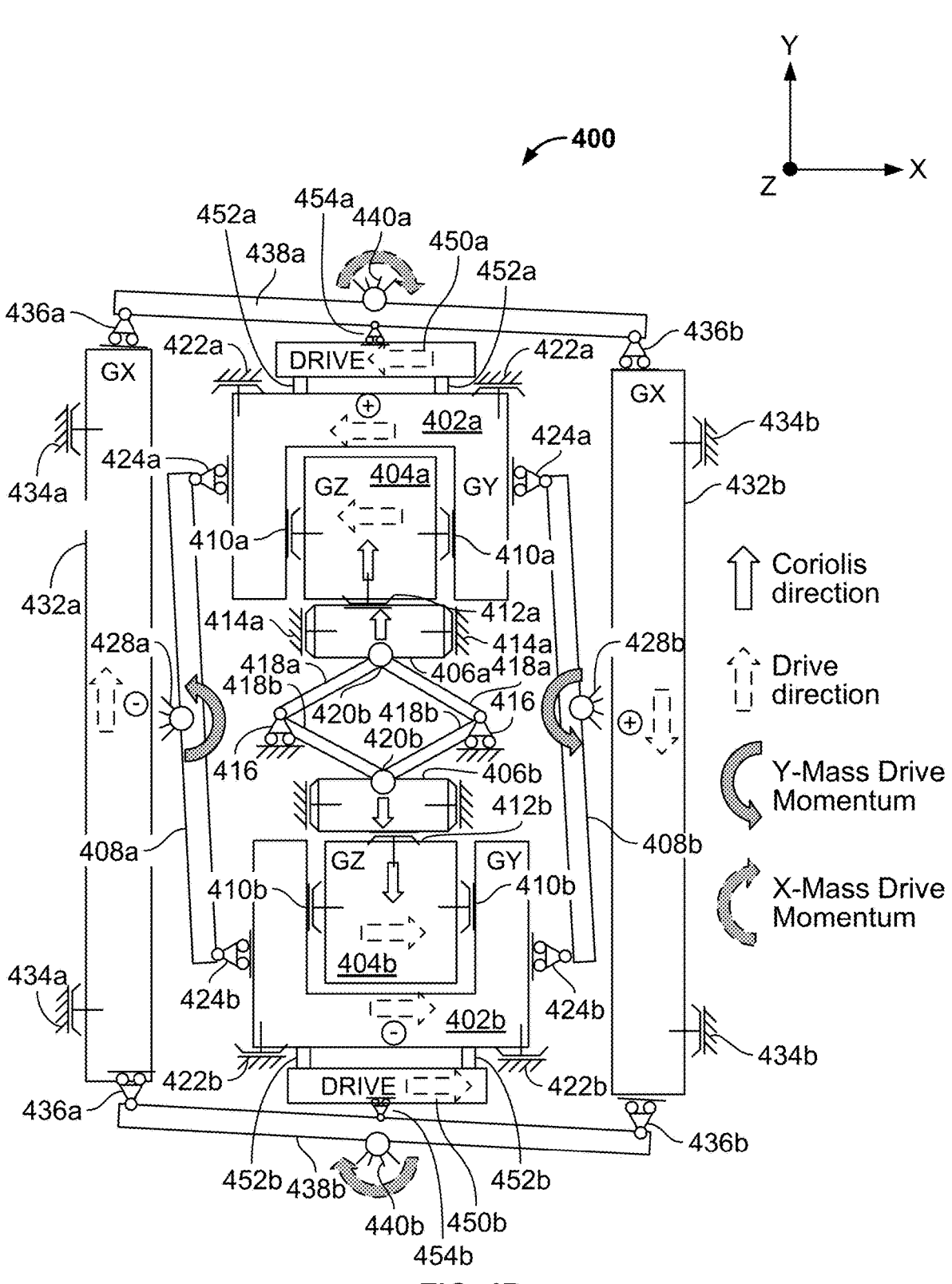
FIG. 4B depicts an exemplary drive motion of the balanced three-axis MEMS gyroscope including coupling through a drive system of FIG. 4A in accordance with an embodiment of the present disclosure.

Referring now to FIGS. 4A and 4B, an exemplary balanced three-axis MEMS gyroscope 400 that includes a coupling through a drive system is illustrated and described in further detail, in accordance with an embodiment of the present disclosure. More specifically, FIG. 4A illustrates the gyroscope 400 in an initial or nominal position, with FIG. 4B illustrating the gyroscope 400 with drive and other components of the gyroscope 400 having been shifted or moved as a result of a first portion of the anti-phase drive motion. Although FIGS. 4A and 4B will be described in the context of a particular application and system components, it will be understood that the present disclosure may be utilized with a variety of multi-axis gyroscope configurations. Although particular components are depicted and described in FIGS. 4A and 4B, it will be understood that components may be added, removed, substituted, or modified in accordance with the present disclosure.

The components of gyroscope 400 for the first in-plane axis (e.g., for sensing angular velocity about the y-axis), second in-plane axis (e.g., for sensing angular velocity about the x-axis) and the out-of-plane axis (e.g., for sensing angular velocity about the z-axis) are mostly identical to those of gyroscope 200 of FIGS. 2A and 2B and gyroscope 300 of FIGS. 3A and 3B and operate in the same manner. Thus, for example, in-plane proof mass 402*a* corresponds to in-plane proof mass 202*a* and 302*a*, sliders 410*a* correspond to sliders 210*a* and 310*a*, and like throughout the gyroscopes 400, 300, and 200. Comparing FIGS. 4A and 4B to FIGS. 3A and 3B, the embodiment of FIGS. 4A and 4B does not depict drive linkages (e.g., drive linkages 330*a*-330*d*) connecting the first and second in-plane proof masses 402*a* and 402*b* to the third and fourth in-plane proof masses 432*a* and 432*b*, but instead has separate drive massed 450*a* and 450*b* rigidly connected to the first and second in-plane proof masses 402*a* and 402*b*, respectively, and to the lever arms 438*a* and 438*b* at their pivot points about hinges 440*a* and 440*b*.

Accordingly, instead of a drive linkage system as described above for the gyroscope 300 (i.e., with multiple drive linkages 330), the gyroscope 400 includes drive masses 450 that couple the first and second in-plane drive systems. More specifically, the gyroscope 400 includes a first drive mass 450*a* (e.g., driven by fixed drive electrodes, not depicted) rigidly coupled to the first in-plane proof mass 402*a* to support a x-axis drive oscillation, and via roller 454*a*, that is coupled to (a) the third in-plane proof mass 432*a* and (b) the fourth in-plane proof mass 432*b* via the third lever arm 438*a*. The gyroscope 400 also includes a second drive mass 450*b* (e.g., driven by fixed drive electrodes, not depicted) rigidly coupled to the second in-plane proof mass 402*b* to support a x-axis drive oscillation in anti-phase to the movement of first drive mass 450*b*, and via roller 454*b*, that is coupled to (a) the third in-plane proof mass 432*a* and (b) the fourth in-plane proof mass 432*b* via the fourth lever arm 438*b*.

The drive masses 450*a* and 450*b* may be coupled to the first and second drive systems in any manner that is convenient. For example, as illustrated in FIGS. 4A and 4B, one or more first drive springs 452*a* (e.g., a pair of first drive springs 452*a*) rigid along the x-axis drive direction couple the first drive mass 450*a* to the first in-plane proof mass 402*a* to cause the oscillation of the first in-plane proof mass 402*a*. Similarly, one or more second drive springs 452*b* couple the second drive mass 450*b* to the second in-plane proof mass 402*b* to cause the anti-phase oscillation of the second in-plane proof mass 402*b*. The drive system of the gyroscope 400 also includes one or more lever arms, links, or rigid bodies (e.g., lever arms 438*a* and 438*b*) coupled between the first in-plane proof mass 402*a* and the second in-plane proof mass 402*b*, which may synchronize in-plane movement of the first in-plane proof mass 402*a* and the second in-plane proof mass 402*b*.

Accordingly, as depicted in FIGS. 4A (stationary) and 4B (in motion), when drive mass 450*a* is driven in the negative x-direction the first in-plane proof mass 402*a* is also moved with the drive mass 450*a* in the negative x-direction via rigid springs 452*a*, while drive mass 450*b* is simultaneously driven in the positive x-direction which causes the second in-plane proof mass 402*b* to move with the drive mass 450*b* in the positive x-direction via rigid springs 452*b*. The drive motion of drive mass 450*a* in the negative x-direction also causes rotation of lever arm 438*a* in a clockwise direction about hinge 440*a* while the drive motion of drive mass 450*b* in the positive x-direction causes rotation of lever arm 438*b* in a clockwise direction about hinge 440*b*, which collectively couple and synchronize the y-axis anti-phase translation of third and fourth in-plane proof mass 432*a* and 432*b*. As described herein, the angular momentum due to these rotations of the x-axis system balance with the angular momentum of the y-axis system, which is in the opposite rotational direction in anti-phase. Movement of the drive masses in the opposite x-directions causes anti-phase movement (i.e., in the opposite linear or rotational direction) of each of the driven components depicted in FIGS. 4A and 4B as well as anti-phase Coriolis sense motion (e.g., in or out of plane for the in-plane proof masses and the opposite linear direction for out-of-plane proof masses).

Figure 5:
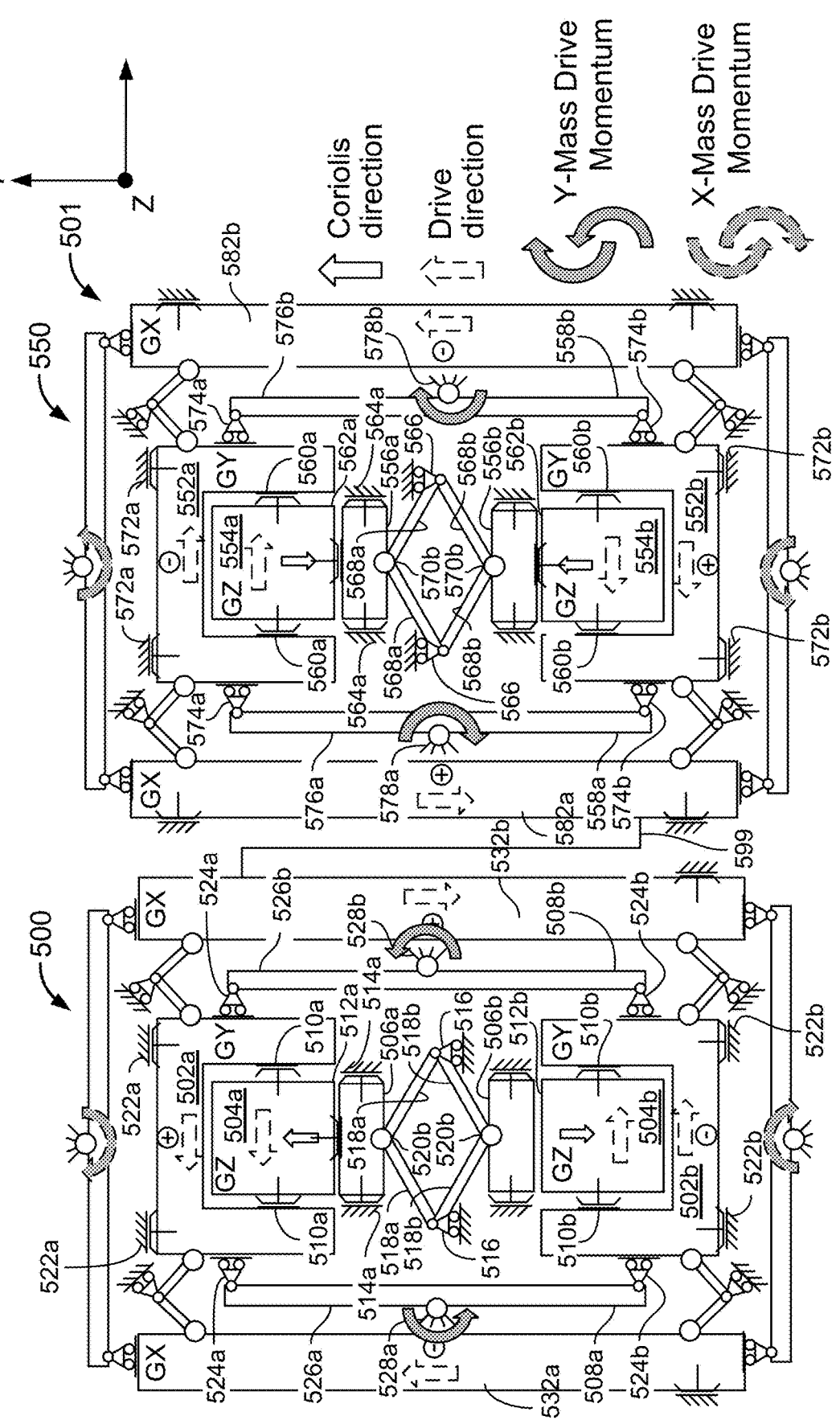
FIG. 5 depicts an exemplary balanced three-axis MEMS gyroscope with coupled drive systems in accordance with an embodiment of the present disclosure.

Referring now to FIG. 5, an exemplary balanced three-axis MEMS gyroscope with a coupled drive system is illustrated and described in further detail, in accordance with an embodiment of the present disclosure. Generally, the gyroscope 501 includes two identical 3-axis gyroscope structures 500 and 500, each of which duplicates the example structure of MEMS gyroscope 300. Gyroscope structures 500 and 550 are coupled in a mirror arrangement, with a coupling 599 between adjacent in-plane proof masses 532*b* and 582*a* of the two gyroscope structures. More specifically, in the example illustrated, the MEMS gyroscope 501 includes a first gyroscope structure 500 and a second gyroscope structure 550. In an example, first gyroscope structure 500 is identical to gyroscope 300 described above, with like numerals indicating like features. Additionally, second gyroscope structure 550 is identical to first gyroscope structure 500, except that the drive systems thereof move in anti-phase to that of the first gyroscope structure 500. Corresponding components of the second gyroscope structure 550 are indicated with a reference number increased by 50. A coupling 599 synchronizes translation of adjacent in-plane proof mass 532*b* of gyroscope structure 501 with in-plane proof mass 582*a* of gyroscope structure 550. In this manner, drive systems for each of the gyroscope structures 500 and 550 work in opposite directions, thereby causing rotational forces associated with the drive systems and sensing motion to be further balanced or cancelled out.

Figure 6:
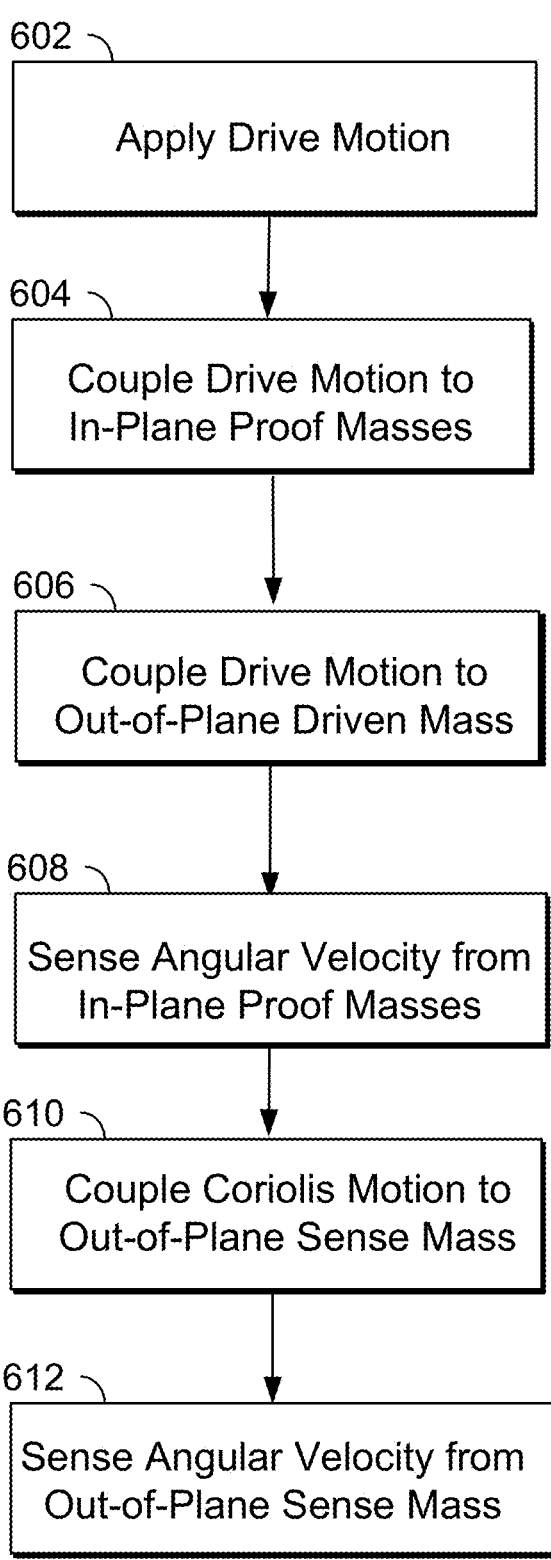
FIG. 6 depicts exemplary steps of operating an exemplary balanced multi-axis MEMS gyroscope in accordance with an embodiment of the present disclosure.

FIG. 6 depicts an example process 600 of operating a balanced multi-axis MEMS gyroscope (e.g., gyroscope 200, 300, 400, or 500 described above), in accordance with an embodiment of the present disclosure. Although steps or blocks of process 600 are depicted in a certain order for FIG. 6, this is an example and not limiting. For example, steps may be removed, modified, or substituted, and additional steps may be added in certain embodiments, and in some embodiments, the order of certain steps may be modified.

Process 600 may begin at block 602, where a drive motion is applied, e.g., via one or more drive electrodes located adjacent to masses of any of gyroscopes 200, 300, 400, or 500. For example, drive electrodes may drive multiple masses in anti-phase along an in-plane direction (e.g., the x-axis direction as depicted herein). The process may then continue to block 604.

At block 604, a drive motion may be coupled to one or more in-plane proof masses, e.g., one or more of in-plane proof masses 202*a-b*, 302*a-b*, 332*a-b*, 402*a-b*, 502*a-b*, 532*a-b*, 552*a-b*, and 582*a-b*. In some embodiments, the drive motion be directly imparted on some of the in-plane proof masses such as by drive electrodes, while in other embodiments a drive mass may be directly driven by drive electrodes and transfer the drive motion to the in-plane proof masses. In embodiments with in-plane proof masses that have perpendicular drive motions, a first linear drive motion (e.g., along the x-direction) may be translated to the perpendicular drive direction, such as via drive linkages, lever arms, and combinations thereof. Each of the in-plane proof masses moves in anti-phase with another in-plane proof mass, with the drive motion synchronized via a coupling system such as lever arms. The respective drive couplings are configured in an manner such that an angular momentum of the components associated with a first in-plane sense axis (e.g., y-axis) balances with the angular momentum of the components associated with a second in-plane sense axis (e.g., x-axis), based on anti-phase clockwise and counterclockwise rotation of the respective components. Process 600 may then proceed to block 606.

At block 606, a drive motion, e.g., as described in block 604, may be coupled to an out-of-plane proof mass, which in turn may include multiple interconnected masses (e.g., each out-of-plane proof mass including a driven mass and a sense mass). The drive motion may be in plane and each out-of-plane proof mass may move in anti-phase with the another out-of-plane proof mass. Accordingly, driven masses (e.g., driven masses 204, 304, 404, 504, and/or 554) are driven such via a connection to a drive mass or an in-plane proof mass, while the sense masses are not driven. Process 600 may then proceed to block 608.

At block 608, angular velocity may be sensed via one or more in-plane proof masses. For example, for the y-axis proof masses, a Coriolis force may be generated based on the anti-phase x-direction drive movement of the proof masses and an angular velocity about the y-axis, resulting in anti-phase movement of the proof masses out of plane in the positive z-axis and negative z-axis directions, based on the direction of the x-axis drive and the direction of rotation about the y-axis. For the x-axis proof masses, a Coriolis force may be generated based on the anti-phase y-direction drive movement of the proof masses and an angular velocity about the x-axis, resulting in anti-phase movement of the proof masses out of plane in the positive z-axis and negative z-axis directions, based on the direction of the y-axis drive and the direction of rotation about the x-axis. These movements in response to Coriolis forces may be sensed, for example, by planar electrodes located on a substrate on a plane parallel to the device plane (e.g., on a substrate below the drive plane). Process 600 may then proceed to block 610.

At block 610, a Coriolis motion may be coupled to the out-of-plane sense masses. For example, a Coriolis force may be generated on the out-of-plane driven masses based on the anti-phase x-direction drive movement of the driven masses and an angular velocity about the z-axis, resulting in anti-phase movement of the driven masses in-plane in the positive y-axis and negative y-axis directions, based on direction of the y-axis drive and the direction of rotation about the z-axis. This Coriolis force is then transferred to the out-of-plane sense masses, causing an anti-phase oscillation of the out-of-plane sense masses. This sense motion may in turn be coupled such as via a central coupling system. Process may then proceed to block 612.

At block 612, an angular velocity may be sensed based on the anti-phase movement of the out-of-plane sense masses due to the Coriolis force. For example, drive electrodes may be located adjacent to each of the drive masses in the device plane to sense the movement of the sense masses.

Figure 7:
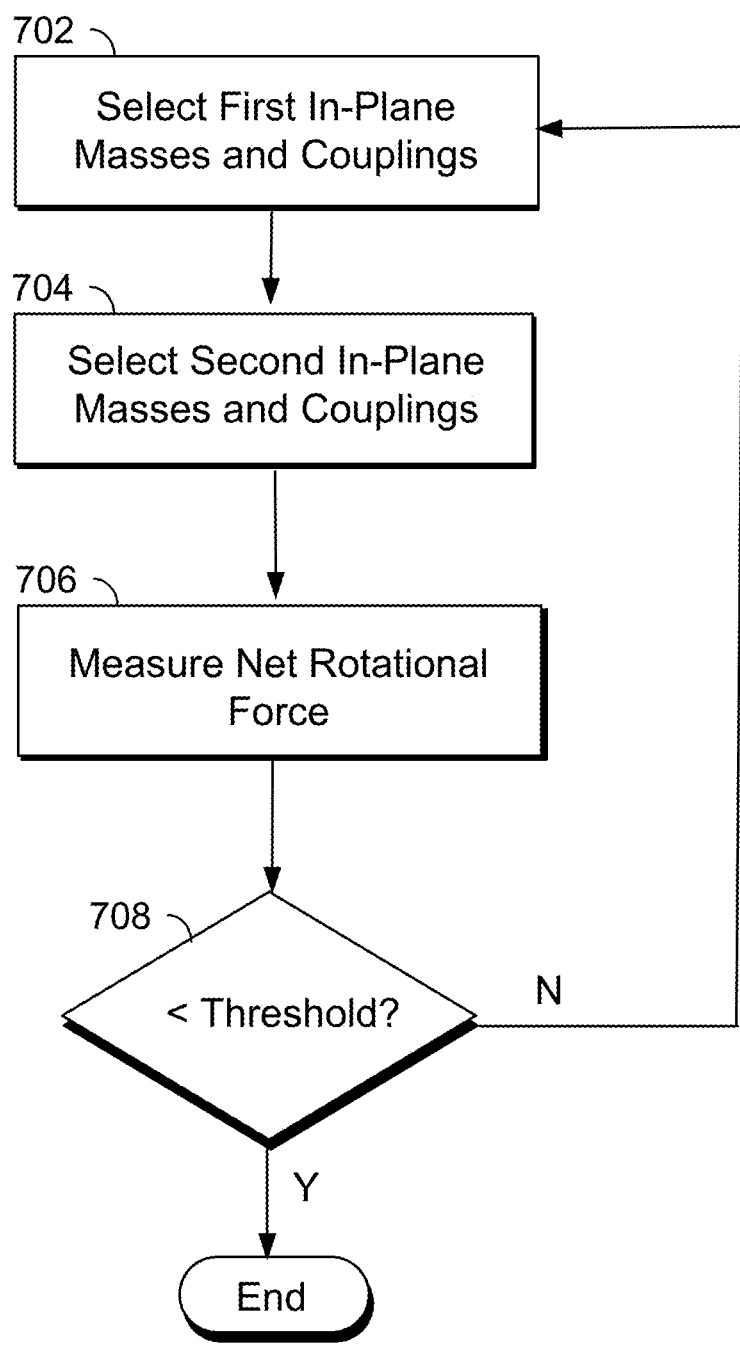
FIG. 7 depicts exemplary steps of tuning rotational balance of an exemplary three-axis MEMS gyroscope in accordance with an embodiment of the present disclosure.

Turning now to FIG. 7, an exemplary process 700 of tuning rotational balance of an exemplary three-axis MEMS gyroscope is illustrated and described in further detail, in accordance with an embodiment of the present disclosure. Although steps or blocks of process 700 are depicted in a certain order for FIG. 7, this is an example and not limiting. For example, steps may be removed, modified, or substituted, and additional steps may be added in certain embodiments, and in some embodiments, the order of certain steps may be modified.

Process 700 generally may facilitate selection of components for a MEMS gyroscope, e.g., gyroscope 200, 300, 400 and/or 500, in a manner that balances or cancels internal reaction forces associated with a drive system(s) of the gyroscope. As noted above, in some examples multiple drive systems may be employed which are configured to operate in anti-phase with respect to each other and to couple movements between components. Accordingly, various size, weight, or other relevant parameters may be selected for individual components of each drive system, such as proof masses, lever arms, or the like, in an effort to balance out momentum of the drive systems.

Process 700 may begin at block 702, where a first in-plane system (e.g., mass and couplings) may be selected, for example, including the size and proportion of masses, types of couplings, distance between masses, lever arm size and shape, hinging (rotation) points, and the like. Similarly, at block 704 a second in-plane system (e.g., mass and couplings) may be selected, including couplings to the first in-plane system that result in a direction of rotation that oscillates in anti-phase with a direction of rotation of the first in-plane system.

Proceeding to block 706, a net rotational force may be measured or otherwise determined (e.g., based on a simulations or analysis of prototypes). For example, overall rotational force imparted to the MEMS gyroscope by the drive systems may be determined. Processing may then continue to block 708, where process 700 may query whether the net rotational force is less than a threshold. A threshold may be selected to correspond to a margin of error or other relevant parameter for establishing a balanced MEMS gyroscope. If the threshold is not exceeded or the gyroscope is otherwise determined to have a sufficiently low net rotational force, process 700 may terminate.

Alternatively, if the net rotational force is determined to exceed the threshold at block 708, process 700 may proceed to block 702. In this manner, to the extent the MEMS gyroscope is not adequately balanced, one or more different parameters may be selected for the first in-plane mass and associated couplings or the second in-plane mass and associated couplings. Further, subsequent parameter selections may be made based upon a degree of the imbalance determined at block 708.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical system (MEMS) gyroscope, comprising:

a drive system configured to impart a drive motion on a plurality of proof masses within a device plane of the MEMS gyroscope;

a first in-plane proof mass of the plurality of proof masses operably coupled to the drive system to oscillate along a first axis in the device plane in response to the drive motion, wherein the first in-plane proof mass moves out of plane in response to an angular velocity about a second axis within the plane and that is perpendicular to the first axis;

a second in-plane proof mass of the plurality of proof masses operably coupled to the drive system to oscillate in anti-phase to the first in-plane proof mass in response to the drive motion, wherein the second in-plane proof mass moves out-of-plane in anti-phase to the first in-plane proof mass in response to the angular velocity about the second axis;

a first out-of-plane proof mass comprising:

a first driven mass operably coupled to the drive system via the first in-plane proof mass to oscillate along an axis parallel to the first axis in the device plane in response to the drive motion, wherein the first driven mass moves in the device plane perpendicular to the first axis in response to an angular velocity about an out-of-plane axis; and a first sense mass coupled to the first driven mass such that the first sense mass does not move in the device plane in response to the drive motion and to translate perpendicular to the first axis based on movement of the first driven mass in response to the angular velocity about the out-of-plane axis;

a second out-of-plane proof mass comprising:

a second driven mass operably coupled to the drive system via the second in-plane proof mass to oscillate in anti-phase to the first driven mass in the device plane in response to the drive motion, wherein the second driven mass moves in the device plane perpendicular to the first axis in anti-phase to the first driven mass in response to the angular velocity about the out-of-plane axis; and a second sense mass coupled to the second driven mass such that the second sense mass does not move in the device plane in response to the drive motion and to translate perpendicular to the first axis in anti-phase to the first sense mass based on the movement of the first driven mass in response to the angular velocity about the out-of-plane axis; and a coupling link connecting the first sense mass to the second sense mass, wherein the coupling link synchronizes anti-phase translation of the first sense mass and the second sense mass.

2. The MEMS gyroscope of claim 1, further comprising:

a first lever arm connected to a first side of the first in-plane proof mass and a first side of the second in-plane proof mass; and a second lever arm connected to a second side of the first in-plane proof mass opposite the first side of the first in-plane proof mass and a second side of the second in-plane proof mass opposite the first side of the second in-plane proof mass.

3. The MEMS gyroscope of claim 2, further comprising:

a third in-plane proof mass of the plurality of proof masses operably coupled to the drive system to oscillate along the second axis in the device plane in response to the drive motion, wherein the third in-plane proof mass moves out of plane in response to an angular velocity about the first axis; and a fourth in-plane proof mass of the plurality of proof masses operably coupled to the drive system to oscillate in anti-phase to the third in-plane proof mass in response to the drive motion, wherein the fourth in-plane proof mass moves out-of-plane in anti-phase to the third in-plane proof mass in response to the angular velocity about the first axis.

4. The MEMS gyroscope of claim 3, further comprising:

a third lever arm connected to a first side of the third in-plane proof mass and a first side of the fourth in-plane proof mass; and a fourth lever arm connected to a second side of the third in-plane proof mass opposite the first side of the third in-plane proof mass and a second side of the fourth in-plane proof mass opposite the first side of the fourth in-plane proof mass.

5. The MEMS gyroscope of claim 4, further comprising:

a first pivot point of the first lever arm that the first lever arm rotates about in a first rotational direction in response to the drive motion;

a second pivot point of the second lever arm that the second lever arm rotates about in the first rotational direction in response to the drive motion;

a third pivot point of the third lever arm that the third lever arm rotates about in a second rotational direction opposite the first rotational direction in response to the drive motion; and a fourth pivot point of the fourth lever arm that the fourth lever arm rotates about in the second rotational direction in response to the drive motion.

6. The MEMS gyroscope of claim 5, wherein a first drive momentum associated with rotations of the first lever arm and the second lever arm is balanced with a second drive momentum associated with rotations of the third lever arm and the fourth lever arm.

7. The MEMS gyroscope of claim 4, wherein the first in-plane proof mass, the second in-plane proof mass, the first lever arm, and the second lever arm collectively comprise a first in-plane driven system, wherein the third in-plane proof mass, the fourth in-plane proof mass, the third lever arm, and the fourth lever arm collectively comprise a second in-plane driven system, and further comprising a drive linkage system linking the first in-plane driven system to the second in-plane driven system.

8. The MEMS gyroscope of claim 7, wherein the drive linkage system comprises:
    a first drive linkage linking the first in-plane proof mass to the third in-plane proof mass;
    a second drive linkage linking the first in-plane proof mass to the fourth in-plane proof mass;
    a third drive linkage linking the second in-plane proof mass to the third in-plane proof mass; and
    a fourth drive linkage linking the second in-plane proof mass to the fourth in-plane proof mass.

9. The MEMS gyroscope of claim 8, wherein each of the first, second, third, and fourth drive linkages comprises two rigid links connected at a central hinge.

10. The MEMS gyroscope of claim 9, wherein each end of the rigid links opposite the central hinge is pivotally connected to one of the in-plane proof masses.

11. The MEMS gyroscope of claim 7, wherein the drive linkage system comprises:
    a first drive mass coupling the first in-plane proof mass to the third in-plane proof mass and the fourth in-plane proof mass via the third lever arm; and
    a second drive mass coupling the second in-plane proof mass to the third in-plane proof mass and the fourth in-plane proof mass via the fourth lever arm.

12. The MEMS gyroscope of claim 7, wherein the second in-plane driven system surrounds the first in-plane driven system within the device plane.

13. The MEMS gyroscope of claim 4, wherein the first lever arm is located adjacent to the third in-plane proof mass, the second lever arm is located adjacent to the fourth in-plane proof mass, the third lever arm is located adjacent to the first in-plane proof mass, and the fourth lever arm is located adjacent to the second in-plane proof mass.

14. The MEMS gyroscope of claim 12, wherein the third in-plane proof mass is located outside of the first lever arm with respect to a center point of the MEMS gyroscope, the fourth in-plane proof mass is located outside of the second lever arm with respect to the center point, the third lever arm is located outside of the first in-plane proof mass with respect to the center point, and the fourth lever arm is located outside of the second in-plane proof mass with respect to the center point.

15. The MEMS gyroscope of claim 1, wherein the drive system comprises a first drive mass and a second drive mass, further comprising:
    one or more first drive springs coupling the first drive mass to the first in-plane proof mass to cause the oscillation of the first in-plane proof mass;
    one or more second drive springs coupling the second drive mass to the second in-plane proof mass to cause the anti-phase oscillation of the second in-plane proof mass; and at least one lever arm coupled between the first in-plane proof mass and the second in-plane proof mass, wherein the at least one lever arm synchronizes in-plane movement of the first in-plane proof mass and the second in-plane proof mass.

16. The MEMS gyroscope of claim 15, further comprising:
    one or more third drive springs coupling the first in-plane proof mass to the first driven mass cause the oscillation of the first driven mass; and
    one or more fourth drive springs coupling the second in-plane proof mass to the second driven mass cause the oscillation of the second driven mass.

17. The MEMS gyroscope of claim 16, further comprising:
    a first Coriolis coupling between the first driven mass and the first sense mass, wherein the first Coriolis coupling is compliant in response to the drive motion and is rigid in response to a Coriolis force caused by the angular velocity about the out-of-plane axis; and
    a second Coriolis coupling between the second driven mass and the second sense mass, wherein the second Coriolis coupling is compliant in response to the drive motion and is rigid in response to the Coriolis force caused by the angular velocity about the out-of-plane axis.

18. The MEMS gyroscope of claim 1, wherein the coupling link comprises a plurality of rigid links.

19. The MEMS gyroscope of claim 18, wherein the plurality of rigid links are pivotally secured to the first sense mass and the second sense mass.

20. A method of assembling a microelectromechanical system (MEMS) gyroscope, comprising:
    providing a drive system configured to impart a drive motion on a plurality of proof masses within a device plane of the MEMS gyroscope;
    installing a first in-plane proof mass of the plurality of proof masses, wherein the first in-plane proof mass is operably coupled to the drive system to oscillate along a first axis in the device plane in response to the drive motion, wherein the first in-plane proof mass moves out of plane in response to an angular velocity about a second axis within the plane and that is perpendicular to the first axis;
    installing a second in-plane proof mass of the plurality of proof masses, wherein the second in-plane proof mass is operably coupled to the drive system to oscillate in anti-phase to the first in-plane proof mass in response to the drive motion, wherein the second in-plane proof mass moves out-of-plane in anti-phase to the first in-plane proof mass in response to the angular velocity about the second axis;
    installing a first out-of-plane proof mass and a second out-of-plane proof mass, wherein the first out-of-plane proof mass comprises:
        a first driven mass operably coupled to the drive system via the first in-plane proof mass to oscillate along an axis parallel to the first axis in the device plane in response to the drive motion, wherein the first driven mass moves in the device plane perpendicular to the first axis in response to an angular velocity about an out-of-plane axis; and
        a first sense mass coupled to the first driven mass such that the first sense mass does not move in the device plane in response to the drive motion and to translate perpendicular to the first axis based on movement of the first driven mass in response to the angular velocity about the out-of-plane axis; and wherein the second out-of-plane proof mass comprises:

a second driven mass operably coupled to the drive system via the second in-plane proof mass to oscillate in anti-phase to the first driven mass in the device plane in response to the drive motion, wherein the second driven mass moves in the device plane perpendicular to the first axis in anti-phase to the first driven mass in response to the angular velocity about the out-of-plane axis; and a second sense mass coupled to the second driven mass such that the second sense mass does not move in the device plane in response to the drive motion and to translate perpendicular to the first axis in anti-phase to the first sense mass based on the movement of the first driven mass in response to the angular velocity about the out-of-plane axis; and connecting the first sense mass to the second sense mass with a coupling link configured to synchronize anti-phase translation of the first sense mass and the second sense mass.

* * * * *